United States Patent
Larsen et al.

(10) Patent No.: US 8,690,358 B2
(45) Date of Patent: Apr. 8, 2014

(54) VIDEO PROJECTION DEVICE FOR MOBILE DEVICE HAVING A FIRST PROJECTION SURFACE INTEGRAL WITH A SURFACE OF THE MOBILE DEVICE

(75) Inventors: Glen C. Larsen, Issaquah, WA (US); Russell Sanchez, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 261 days.

(21) Appl. No.: 13/169,040

(22) Filed: Jun. 27, 2011

(65) Prior Publication Data

US 2012/0327315 A1 Dec. 27, 2012

(51) Int. Cl.
G03B 21/28 (2006.01)

(52) U.S. Cl.
USPC .......... 353/98; 353/30; 353/46; 353/50; 353/119; 359/838; 348/208.4; 348/208.5

(58) Field of Classification Search
USPC ......... 353/30–31, 46, 50, 51, 74, 79, 85, 119, 353/98, 99, 101, 100; 348/208.5, 208.4, 348/208.99, 240.99, 744, 745, 750, E9.027; 349/5, 7–9; 359/822, 811, 813, 819, 359/823–824, 820, 821, 838
See application file for complete search history.

(56) References Cited

U.S. PATENT DOCUMENTS

| | | | |
|---|---|---|---|
| 6,031,587 A * | 2/2000 | Okuyama et al. | 349/8 |
| 6,489,934 B1 | 12/2002 | Klausner | |
| 6,953,252 B2 | 10/2005 | Way | |
| 7,670,012 B2 | 3/2010 | Solomon et al. | |
| 7,703,930 B2 | 4/2010 | Plut | |
| 7,824,039 B2 * | 11/2010 | Takito et al. | 353/69 |
| 8,104,899 B2 * | 1/2012 | Ha et al. | 353/69 |
| 8,414,130 B2 * | 4/2013 | Pelah | 353/79 |
| 8,414,349 B2 * | 4/2013 | Boman et al. | 446/268 |
| 2003/0067432 A1 * | 4/2003 | Watanabe et al. | 345/87 |
| 2007/0198107 A1 | 8/2007 | Delgado | |
| 2010/0265473 A1 * | 10/2010 | Yamashita et al. | 353/85 |
| 2011/0164114 A1 * | 7/2011 | Kobayashi et al. | 348/46 |

OTHER PUBLICATIONS

"Cell Phone Projector-Triband GSM/GPRS with Touchscreen", Retrieved at <<http://www.technama.com/2009/cell-phone-projector-triband-gsmgprs-with-touchscreen/>>, May 19, 2009, pp. 11.
O'Brien, Kevin, "Mobile Projector First Look", Retrieved at <<http://www.notebookreview.com/default.asp?newsID=4346>>, Apr. 3, 2008, pp. 3.

* cited by examiner

Primary Examiner — Sultan Chowdhury
(74) Attorney, Agent, or Firm — International IP Law Group, PLLC

(57) ABSTRACT

A mobile device such as a robot includes a processor, a memory that stores components executable by the processor, and a projection assembly. The projection assembly includes a projector, a lens, a movable mirror, and a first projection surface integral with a surface of the mobile device. The components include a projection component and a control component. The projection component determines the projection parameters, and projects the image onto the movable mirror, dependent upon the projection parameters. The control component causes the projector and the lens to focus the image onto the first projection surface, and further causes the movable mirror to reflect the image onto the first projection surface.

8 Claims, 6 Drawing Sheets

100

VIDEO PROJECTION DEVICE FOR MOBILE DEVICE HAVING A FIRST PROJECTION SURFACE INTEGRAL WITH A SURFACE OF THE MOBILE DEVICE

BACKGROUND

A visual interface is a common type of interface used on modern electronic and computing devices, including robotic devices or "robots." The typical visual interface takes the form of a display, such as a video monitor or touch screen, attached to the device. The flat, rectangular display has become an iconic form of visual interface. Paradigms as to the methods of device interaction are often associated with devices that include such typical visual interfaces or displays. For example, the expected method of interacting with a device having a typically visual interface or display may include the use of a mouse, keyboard, remote control, and, increasingly, touch interfaces. The presence of a flat rectangular display screen on a robot similarly implies to a user that such traditional methods of device interaction are to be employed. However, many robots are intended to accept other methods of interaction that may be more efficient than the aforementioned traditional methods of interaction, and therefore the use of a non-typical visual interface on robotic devices may avoid the paradigms of device interaction and thereby enhance the efficiency of interaction with such devices.

SUMMARY

The following is a brief summary of subject matter that is described in greater detail herein. This summary is not intended to be limiting as to the scope of the claims. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The claimed subject matter, in one embodiment, generally provides a mobile device such as a robot including a processor, a memory storing components executable by the processor, and a projection assembly. The projection assembly includes a projector, a lens, a movable mirror, and a first projection surface integral with a surface of the mobile device. The components include a projection component and a control component. The projection component determines the projection parameters, and projects the image dependent upon the projection parameters. The control component causes the movable mirror to reflect the image onto a first projection surface, and causes the projector and the lens to focus the image onto the first projection surface.

Another embodiment of the claimed subject matter relates to a non-transitory memory storing a plurality of processor-executable components including a projection component and a control component. The projection component determines one or more projection parameters and causes a projector to project an image dependent at least in part upon the projection parameters. The control component causes the image to be projected onto a target projection surface as a projected image.

Yet another embodiment of the claimed subject matter relates to a method of projecting an image via an image projection system. The method includes providing to a projector the images to be projected and projection parameters. The method further includes configuring the projection system to project the images upon a target projection surface. The method also includes projecting the image onto the target projection surface dependent at least in part upon the projection parameters.

DETAILED DESCRIPTION

Figure 1:
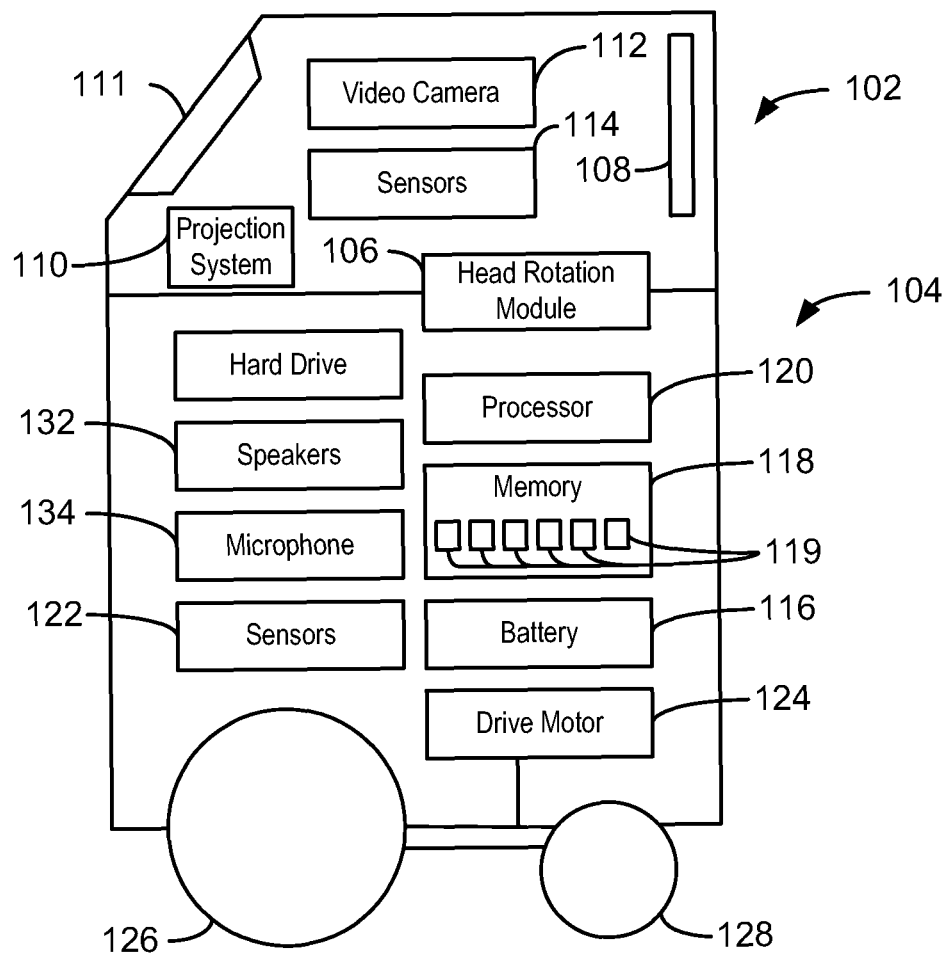
FIG. 1 is a block diagram of a robotic device or robot having one embodiment of a video projection system in accordance with the subject innovation.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not necessarily storage media) may additionally include communication media such as transmission media for wireless signals and the like.

Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

FIG. 1 is a block diagram of a robotic device or "robot" 100 capable of communicating with a remotely-located computing device by way of a network connection. A "robot", as the term will be used herein, is an electro-mechanical machine that includes computer hardware and software that causes the robot to perform functions independently and without assistance from a user. The robot 100 can include a head portion 102 and a body portion 104, wherein the head portion 102 is movable with respect to the body portion 104. The robot 100 can include a head rotation module 106 that operates to couple the head portion 102 with the body portion 104, wherein the head rotation module 106 can include one or more motors that can cause the head portion 102 to rotate with respect to the body portion 104. As an example, the head rotation module 106 may rotate the head portion 102 with respect to the body portion 104 up to 45° in either direction. In another example, the head rotation module 106 can allow the head portion 102 to rotate 90° in either direction relative to the body portion 104. In yet another example, the head rotation module 106 can allow the head portion 102 to rotate 90° in either direction relative to the body portion 104. In still yet another example, the head rotation module 106 can facilitate rotation of the head portion 102 190° in either direction with respect to the body portion 104. The head rotation module 106 can facilitate rotation of the head portion 102 with respect to the body portion 102 in either angular direction.

The head portion 102 may include an antenna 108 that is configured to receive and transmit wireless signals. For instance, the antenna 108 can be configured to receive and transmit Wi-Fi signals, Bluetooth signals, infrared (IR) signals, sonar signals, radio frequency (RF), signals or other suitable signals. The antenna 108 can be configured to receive and transmit data to and from a Cellular tower, the Internet or the cloud in a cloud computing environment. Further, the robot 100 may communicate with a remotely-located computing device, another robot, control device, such as a handheld, or other devices (not shown) using the antenna 108.

The robot 100 further includes at least one projection system 110 configured to display information to one or more individuals that are proximate to the robot 100, which projection system 110 will be more particularly described hereinafter. In the embodiment of FIG. 1, the head portion 102 of the robot 100 includes the projection system 110 and one or more projection surfaces 111 configured to display an image projected by projection system 110 to an individual that is proximate to the robot 100. In other embodiments, the robot 100 may be alternately configured with one or more projection systems 110 and projection surfaces 111 included as part of the body portion 104, included as part of the head portion 102 and part of the body portion 104, or in other suitable combinations.

A video camera 112 disposed on the head portion 102 may be configured to capture video of an environment of the robot 100. In an example, the video camera 112 can be a high definition video camera that facilitates capturing video and still images that are in, for instance, 720p format, 720i format, 1080p format, 1080i format, or other suitable high definition video format. The video camera 112 can be configured to capture relatively low resolution data in a format that is suitable for transmission to the remote computing device by way of the antenna 108. As the video camera 112 is mounted in the head portion 102 of the robot 100, through utilization of the head rotation module 106, the video camera 112 can be configured to capture live video data of a relatively large portion of an environment of the robot 100.

The robot 100 may further include one or more sensors 114. The sensors 114 may include any type of sensor that can utilized by the robot 100 in determining conditions and parameters of its environment, and enable the robot 100 to perform autonomous or semi-autonomous navigation. For example, the sensors 114 may include a depth sensor, an infrared sensor, a camera, a cliff sensor that is configured to detect a drop-off in elevation proximate to the robot 100, a GPS sensor, an accelerometer, a gyroscope, or other suitable sensor type.

The body portion 104 of the robot 100 may include a battery 116 that is operable to provide power to other modules in the robot 100. The battery 116 may be, for instance, a rechargeable battery. In such a case, the robot 100 may include an interface that allows the robot 100 to be coupled to a power source, such that the battery 116 can be recharged.

The body portion 104 of the robot 100 can also include one or more non-transitory computer-readable storage media, such as memory 118. Memory 118 may include magnetic storage devices (e.g., hard disk, floppy disk, and magnetic strips, among others), optical disks (e.g., compact disk (CD), and digital versatile disk (DVD), among others), smart cards, flash memory devices (e.g., card, stick, and key drive, among others), or other suitable types of non-transitory computer-readable storage media. A number of components 119 or sets of instructions are included within memory 118.

A processor 120, such as a microprocessor, may also be included in the body portion 104. As will be described in greater detail below, the components 119 or sets of instructions are executable by the processor 120, wherein execution of such components 119 facilitates the subject innovation as well as controlling and/or communicating with one or more of the other components, systems, and modules of the robot. The processor 120 can be in communication with the other components, systems and modules of the robot 100 by way of any suitable interface, such as a bus hosted by a motherboard. In an embodiment, the processor 120 functions as the "brains" of the robot 100. For instance, the processor 120 may be utilized to process data and/or commands received from a remote device as well as other systems and modules of the robot 100, and cause the robot 100 to perform in a manner that is desired by a user of such robot 100. The components 119 further facilitate, for example, autonomous and manual navigation of the robot 100.

The body portion 104 of the robot 100 can further include one or more sensors 122, wherein such sensors 122 can include any suitable sensor that can output data that can be utilized by the robot 100 to determine conditions and parameters of its environment, and that can be utilized in connection with autonomous or semi-autonomous navigation. For example, the sensors 122 may include sonar sensors, location sensors, infrared sensors, a camera, a cliff sensor, and/or the like. Data that is captured by the sensors 122 and the sensors 114 can be provided to the processor 120 which, by executing on or more of the components 119 stored within memory 118, can process the data and autonomously navigate the robot 100 based at least in part upon the data captured by the sensors.

A drive motor 124 may be disposed in the body portion 104 of the robot 100. The drive motor 124 may be operable to drive wheels 126 and/or 128 of the robot 100. For example, the wheel 126 can be a driving wheel while the wheel 128 can be a steering wheel that can act to pivot to change the orientation of the robot 100. Additionally, each of the wheels 126 and 128 can have a steering mechanism to change the orientation of the robot 100. Furthermore, while the drive motor 124 is shown as driving both of the wheels 126 and 128, it is to be understood that the drive motor 124 may drive only one of the wheels 126 or 128 while another drive motor can drive the other of the wheels 126 or 128. In one embodiment, the wheel 126 represents 2 drive wheels, driven by 2 independent motors, and a single steering wheel, unpowered by any motor. In such an embodiment, the wheel 128 represents the steering wheel. In another embodiment, the wheels 126 or 128 represent more than 2 physical wheels, all of which may be driven by one or more motors. The wheels 126 and 128 may represent various combinations of the wheel arrangements described above.

Upon receipt of data from the sensors 114 and 122 and/or receipt of commands from the remote computing device (for example, received by way of the antenna 108), the processor 120 can transmit signals to the head rotation module 106 and/or the drive motor 124 to control orientation of the head portion 102 with respect to the body portion 104, and/or to control the orientation and position of the robot 100.

The body portion 104 of the robot 100 can further include speakers 132 and a microphone 134. Data captured by way of the microphone 134 can be transmitted to the remote computing device by way of the antenna 108. Accordingly, a user at the remote computing device can receive a real-time audio/video feed and may experience the environment of the robot 100. The speakers 132 can be employed to output audio data to one or more individuals that are proximate to the robot 100. This audio information can be a multimedia file that is retained in the memory 118 of the robot 100, audio files received by the robot 100 from the remote computing device by way of the antenna 108, real-time audio data from a webcam or microphone at the remote computing device, etc.

While the robot 100 has been shown in a particular configuration and with particular modules included therein, it is to be understood that the robot can be configured in a variety of different manners, and these configurations are contemplated and are intended to fall within the scope of the hereto-appended claims. For instance, the head rotation module 106 can be configured with a tilt motor so that the head portion 102 of the robot 100 can tilt up and down within a vertical plane and pivot about a horizontal axis. Alternatively, the robot 100 may not include two separate portions, but may include a single unified body, wherein the entire robot body can be turned to allow the capture of video data by way of the video camera 112. In still yet another embodiment, the robot 100 can have a unified body structure, but the video camera 112 can have a motor, such as a servomotor, associated therewith that allows the video camera 112 to alter position to obtain different views of an environment. Modules that are shown to be in the body portion 104 can be placed in the head portion 102 of the robot 100, and vice versa. It is also to be understood that the robot 100 has been provided as an exemplary mobile device, and solely for the purposes of explanation, and as such is not intended to be limiting as to a particular mobile device or in regard to the scope of the hereto-appended claims.

Figure 2:
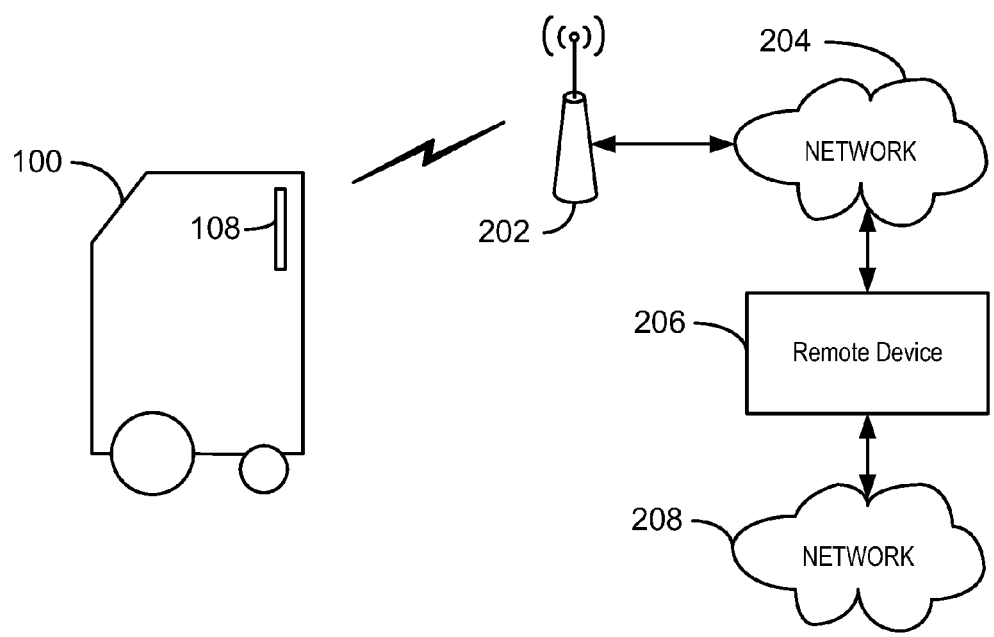
FIG. 2 is a block diagram of an environment that facilitates communications between the robot and one or more remote devices.

FIG. 2 is a block diagram showing an environment 200 that facilitates reception by the robot 100 of commands and/or data from, and the transmission by robot 100 of sensor and other data to, one or more remote devices. More particularly, the environment 200 includes a wireless access point 202, a network 204, and a remote device 206. The robot 100 is configured to receive and transmit data wirelessly via the antenna 108. In an exemplary embodiment, the robot 100 initializes on power up and communicates with the wireless access point 202 and establishes its presence with the wireless access point 202. The robot 100 may then obtain a connection to one or more networks 204 by way of the wireless access point 202. For example, the networks 204 may include a cellular network, the Internet, a proprietary network such as an intranet, or other suitable network.

The remote device 206 can have applications executing thereon that facilitate communication with the robot 100 by way of the network 204. For example, and as will be understood by one of ordinary skill in the art, a communication channel can be established between the remote device 206 and the robot 100 by way of the network 204 through various actions such as handshaking, authentication, and other similar methods. The remote device 206 may include a desktop computer, a laptop computer, a mobile telephone or smart phone, a mobile multimedia device, a gaming console, or other suitable remote device. The remote device 206 can include or have associated therewith a display or touch screen (not shown) that can present data, images, and other information, and provide a graphical user interface to a user 208 pertaining to navigation, control, and the environment surrounding the robot 100.

Figure 3A:
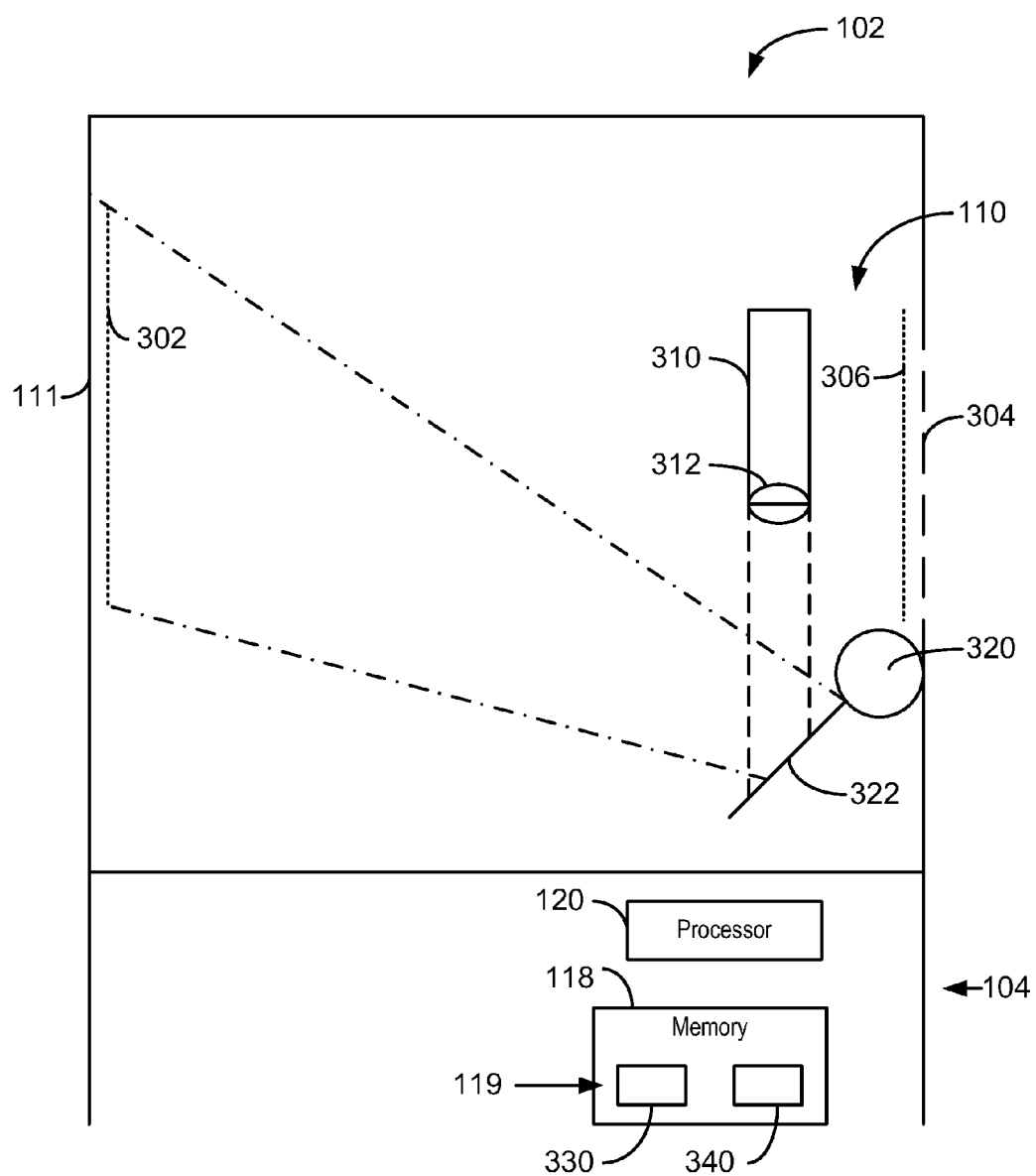
FIG. 3A, is a block diagram of the robot of FIG. 1, and shows the video projection system of the subject innovation in a first exemplary configuration.

With reference to FIG. 3A, one embodiment of a projection system 110 of the subject innovation is illustrated. As shown in FIG. 3A, the projection system 110 is disposed within the head portion 102 of the robot 100, which head portion 102 includes the projection surface 111, a projection surface shutter 302, a projection window 304, a projection window shutter 306, and a projector 310. In alternate embodiments, the robot 100 may be alternately configured with one or more projection systems 110, including the projection surface 111, a projection surface shutter 302, a projection window 304, a projection window shutter 306 and the projector 310 included as part of the body portion 104, included as part of both the head portion 102 and the body portion 104, or in other suitable combinations.

The projection surface 111 may be configured, in one embodiment, as a translucent light-diffusing surface, such as a polymer or plastic surface that is coated with, has embedded therein, or otherwise includes, diffusive particles, and which may be curved or otherwise contoured to match the shape and/or contour of the outer surface of the head portion 102. The projection surface 111 may be one portion or region of the external surface, an internal surface, or may form a portion of both the inner and outer surfaces of the robot 100. When the projection surface 111 is illuminated or otherwise displaying an image, the regions thereof that are not illuminated may appear integrated with the skin or outer surface of the robot 100. Additionally, the projection surface 111 is configured to conceal the inner components of the robot 100, including the projection surface shutter 302, the projection window 304, the projection window shutter 306, and the projector 310, and the other internal components of the projection system 110 and of the robot 100, from the view of an observer of the robot regardless of whether an image is being projected onto the projection surface 111.

In contrast to a conventional display, the images projected onto the projection surface 111 may appear to float on the outer surface of the robot 100, rather than appearing as framed within a typical illuminated rectangular display area. In other words, to an observer of the robot 100 the projection surface 111 may not be visually distinguishable from the skin or outer surface of the robot 100. When no images are being projected onto the projection surface 111 it may appear, when viewed from outside the robot 100, that the projection surface 111 is integral with and substantially indistinguishable visually from the outer surface of the robot 100. The projection surface 111 may be tinted or otherwise configured to match, for example, the appearance and texture of the skin or outer surface of the robot 100. For example, the projection surface 111 may be tinted black to match and blend in with the outer surface or skin of the robot 100 that is also tinted or otherwise black in color. Further, the images projected onto the projection surface 111 appear as if they were generated from within the body of the robot 100, thereby effectively unifying the visual expression in the form of the images projected onto the projection surface 111 with the functionality and modes of interaction of the robot 100.

The projection surface shutter 302 and the projection window shutter 306 are both operable to selectively prevent or permit the passage of light, and thus the projected image, onto the projection surface 111 and through the projection window 304, respectively. In one embodiment, the projection surface shutter 302 and the projection window shutter 306 may be configured as opaque mechanical shutter members that include respective drives or motor mechanisms (not shown) that move or otherwise actuate the projection surface shutter 302 and the projection window shutter 306 between open and closed positions. In another embodiment, the projection surface shutter 302 and the projection window shutter 306 may be configured as electronic or electro-chemical shutter members that are configured to selectively permit and/or prevent the passage of light, and thus the projected image, onto the projection surface 111 and through projection window 304, respectively. In that embodiment, the projection surface shutter 302 and the projection window shutter 306 may be configured as a surface or panel that may be integral or otherwise associated with the corresponding projection surface 111 and the projection window 304, and which may include, be coated with, or have embedded therein, a material, such as a phosphor, liquid crystals or other suitable material, that in one state permit the passage of light and in another state block or otherwise prevents the passage of light.

Projection window 304 is transparent to light. In the embodiment shown, projection window 304 may be configured as a transparent portion of or window defined by head portion 102. Projection window 304 may be configured as a transparent polymer or plastic window or section of the head portion 102 of the robot 100.

In one embodiment, there is no shutter 302 present. In such an embodiment, the projection surface 111 may be translucent. A translucent projection surface may conceal the internal components without a shutter.

The projection system 110 further includes a projector 310 having a lens 312, and a movable mirror 320. The projector 310 may be configured, for example, as a digital graphic projector, and in the embodiment shown is disposed within head portion 102 of the robot 100. The projector 310 is configured to project light and images that are focused, at least in part, by the lens 312, which is movable or otherwise configured to focus the projected light and images onto a desired projection surface via the movable mirror 320. The movable mirror 320 is configured as a mirror or other reflective element, and reflects or otherwise redirects the light and images projected by the projector 310. In an alternate embodiment, movable mirror may comprise a plurality of movable mirror or reflective elements. The movable mirror 320 is selectively movable to a variety of positions or angles to thereby reflect or otherwise redirect to corresponding projection surfaces the light and images projected by the projector 310. The movable mirror 320 includes, in one embodiment, a drive or motor mechanism (not shown) that moves, for example by rotation, the movable mirror 320 to a desired position, angle or other orientation, to thereby project the images onto a desired or target projection surface, as is more particularly described hereinafter.

As shown in FIG. 3A, the robot 100 includes in memory 118 a control component 330 and a projection component 340. Generally, the control component 330 when executed by the processor 120 configures the projection system 110, including the projection surface shutter 302, the projection window shutter 306, the projector 310, the lens 312, and the movable mirror 320 to project an image onto a target projection surface, as determined or indicated by the processor 120. More particularly, in the exemplary embodiment shown in FIG. 3A, the control component 330 when executed by the processor 120 causes the projector 310 and the lens 312 to project an image onto the movable mirror 320 with a focal plane on the projection surface 111, and positions or otherwise places the movable mirror 320 in a position to project the image from the projector 310 onto the projection surface 111 of the robot 100 or through the projection window 304 and onto an external projection surface. The control component 330 also places the projection surface shutter 302 and the projection window shutter 306 in appropriate positions or states for projecting the image onto the indicated target projection surface. Thus, the control component 330 configures the projection system 110 to project the image onto an indicated target projection surface.

The projection component 340 when executed by the processor 120 provides to the projector 310 projection data and the images and information to be projected. Further, the projection component 340 when executed by the processor 120 may be configured to adjust the projection parameters, based at least in part upon the data provided by the sensors 114 and the sensors 122, as will also be more particularly described hereinafter.

With continuing reference to the exemplary embodiment of FIG. 3A, the projection system 110 is shown in a first exemplary configuration that is suitable for projecting an image onto the projection surface 111. The projection component 340 when executed by the processor 120 provides to the projector 310 the projection data and the images to be projected. Execution of the control component 330 by the processor 120 causes the movable mirror 320 to be placed in a first position 322 from which the movable mirror 320 is configured to reflect the image from the projector 310 onto the projection surface 111 of the robot 100, and causes the projector 310 and the lens 312 to project an image via the movable mirror 320 in the first position 322, onto the projection surface 111. The focal plane of the image is on the projection surface 111.

The control component 330 may place the movable mirror 320 in the first position 322 dependent at least in part upon the target projection surface indicated by the processor 120. For example, the processor 120 may analyze the type of images to be projected or their characteristics and based thereon determine an appropriate target projection surface from the available projection surfaces, or may determine the target projection surface based on input from a user of the robot 100.

In the exemplary embodiment of FIG. 3A, execution of the control component 330 by the processor 120 further causes the projection surface shutter 302 to open or enter a state that permits the passage of light and, thus, permits the image to be projected onto the projection surface 111, and may cause the projection window shutter 306 to close or otherwise enter a state that prevents the passage of light and, thus, prevents any images from being projected through the projection window 304 and onto an external surface. In one embodiment, a user may be prevented from looking through the projection window 304 when it is not in use for external projection.

Figure 3B:
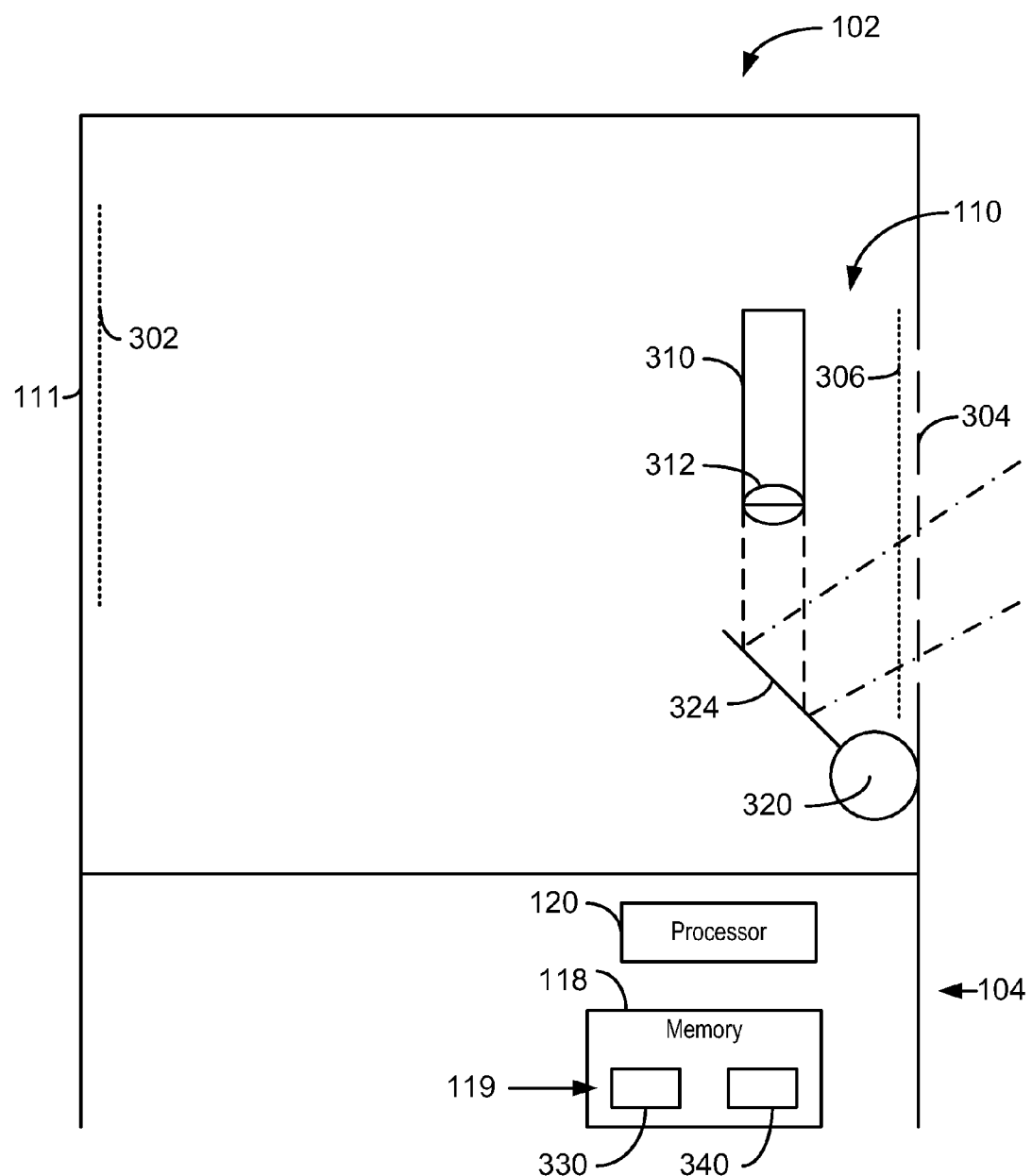
FIG. 3B, is a block diagram of the robot of FIG. 1, showing the video projection system of the subject innovation in second exemplary configuration.

With reference to FIG. 3B, the projection system 110 is shown in a second exemplary configuration that is suitable for projecting an image through the projection window 304 and onto a second position or location upon an external projection surface. The projection component 340 when executed by the processor 120 provides to the projector 310 the projection data and the images to be projected. Execution of the control component 330 by the processor 120 causes the movable mirror 320 to be placed in a second position 324 from which the movable minor 320 is configured to reflect the image from the projector 310 through the projection window 304 and onto the second position of the external projection surface, and causes the projector 310 and the lens 312 to project an image via the movable minor 320 in the second position 324. The image may be focused on the projection surface 111. The control component 330 may place the movable minor 320 in the second position 324 dependent at least in part upon the target projection surface indicated by the processor 120.

In the exemplary embodiment of FIG. 3B, execution of the control component 330 by the processor 120 further causes the projection surface shutter 302 to close or enter a state that prevents the passage of light and, thus, prevents any images from being seen through or being projected onto the projection surface 111, and may cause the projection window shutter 306 to open or otherwise enter a state that permits the passage of light and, thereby, permits the projection of images through the projection window 304 and onto a second position or location upon the external projection surface.

Figure 3C:
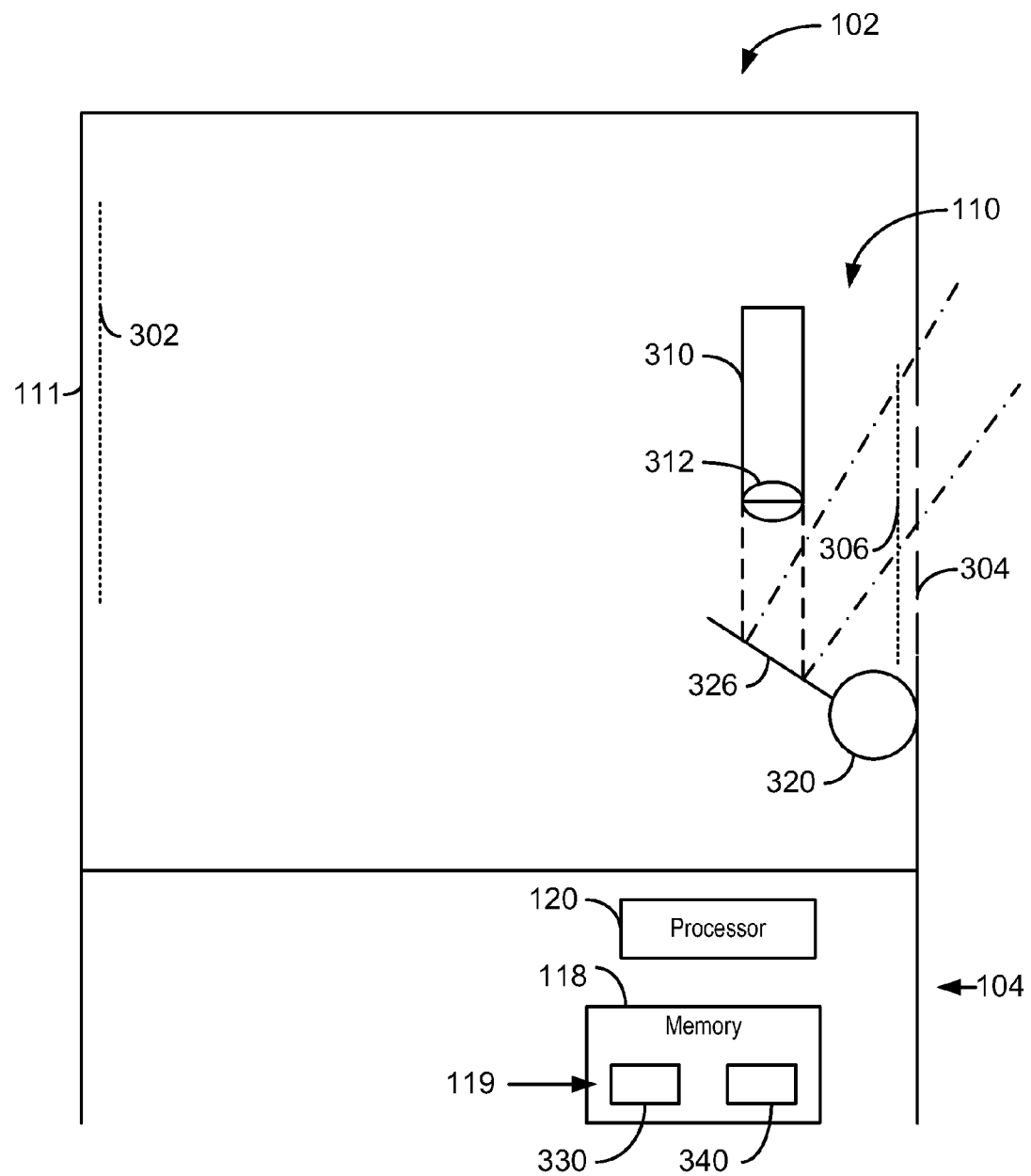
FIG. 3C, is a block diagram of the robot of FIG. 1, and illustrates the video projection system of the subject innovation in a third exemplary configuration.

With reference to FIG. 3C, the projection system 110 is shown in a third exemplary configuration that is suitable for projecting an image through the projection window 304 and onto a third position or location upon the external projection surface. The projection component 340 when executed by the processor 120 provides to the projector 310 the projection data and the images to be projected. Execution of the control component 330 by the processor 120 causes the movable minor 320 to be placed in a third position 326 from which the movable minor 320 is configured to reflect the image from the projector 310 through the projection window 304 and onto the third position of the external projection surface, and causes the projector 310 and the lens 312 to project an image via the movable mirror 320 in the third position 326. The image is focused on the projection surface 111. The control component 330 may place the movable minor 320 in the third position 326 dependent at least in part upon the target projection surface indicated by the processor 120.

In the exemplary embodiment of FIG. 3C, execution of the control component 330 by the processor 120 further causes the projection surface shutter 302 to close or enter a state that prevents the passage of light and, thus, prevents any images from being seen or being projected onto the projection surface 111, and may cause the projection window shutter 306 to open or otherwise enter a state that permits the passage of light and, thereby, permits the projection of images through the projection window 304 and onto the third position or location upon the external projection surface.

The projection component 340 when executed by the processor 120 provides to the projector 310 projection data and the images and information to be projected, which projection data includes and/or determines the projection parameters including, for example, the resolution, focal point and focus, size and orientation of image to be projected, brightness, contrast, aspect ratio, and other parameters. In one embodiment, the projection component 340 may be configured to adjust and otherwise compensate the projection parameters and characteristics of the image to be projected dependent at least in part upon the characteristics of the target projection surface and the projection angle (i.e., the angle of the optical axis). More particularly, projection component 340 when executed by the processor 120 may be configured to, via the sensors 114 and 122, determine various characteristics of the target projection surface, such as the distance to the projection surface, the color and curvature of the projection surface, the projection angle, and other relevant characteristics. Based at least in part upon the determined characteristics of the target projection surface, the projection component 340 may adjust the projected content, or alter the projection parameters and image characteristics to cause the projector 310, or to cause an adjustment to the position of the lens 312 or of the movable mirror 320, to compensate for undesirable image distortion effects that may occur.

For example, the projection component 340 as executed by the processor 120 may determine based at least in part upon sensor data from the sensors 114 and 122 that the target projection surface is a curved surface, such as the projection surface 111 or a curved external projection surface. The projection component 340 may then, as executed by the processor 120, make appropriate corrections or adjustments to the projection parameters, such as increasing depth of field by decreasing the projector aperture, and the characteristics of the image to be projected to compensate for any distortion that may result from projecting the image onto the curved projection surface. As a further example, the projection component 340 as executed by the processor 120 may determine that the angle of the optical axis or projection angle exceeds a predetermined threshold that may, if not compensated for, result in the projected image having a type of distortion known as the keystone effect wherein the projected image appears trapezoidal with the top of the image appearing narrower than the bottom. The projection component 340 may be further configured to make appropriate corrections or adjustments to the projection parameters and the characteristics of the image to be projected to compensate for the keystone distortion. Further, the projection component 340 may invoke the control component 330 to make certain adjustments, such as adjusting the position or angle of the movable mirror 320.

In the embodiments shown, execution of the control component 330 by the processor 120 disposes the movable mirror 320 in one of three predetermined positions, i.e., first position 322, second position 324 and third position 326. However, it is to be understood that the control component 330 may be alternately configured to, for example, place the movable mirror 320 in any number of predetermined positions to thereby project images onto any number of corresponding locations or positions on a target projection surface. As used herein, the term target projection surface includes the internal projection surface 111, the external projection surface, and any other surface onto which an image is or is desired to be projected.

Figure 4:
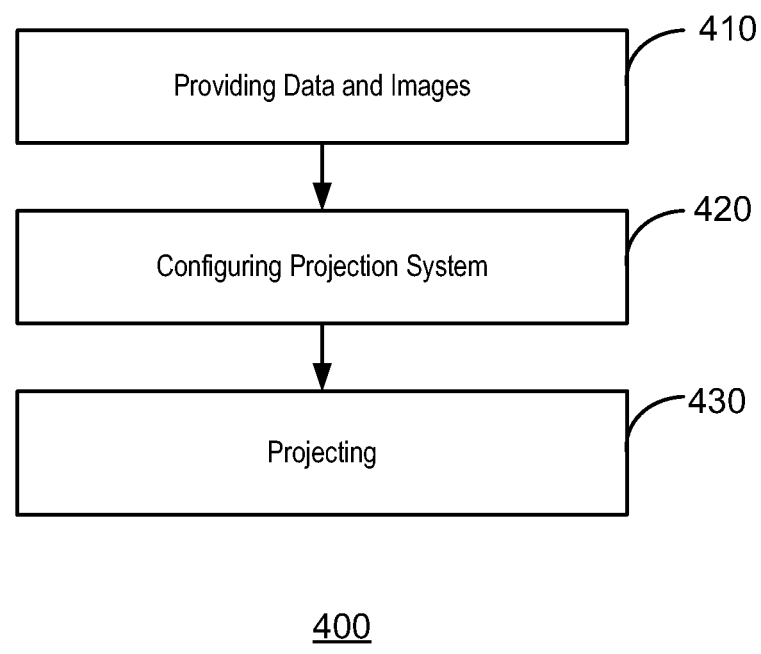
FIG. 4 is a process flow diagram of one embodiment of a method of projecting an image according to the subject innovation.

With reference now to FIG. 4, a method of projecting an image is illustrated. The method 400 includes providing 410 to a projector the images or other information to be projected and projection data. The projection data may include certain projection parameters including, for example, the resolution, focal point and focus, size and orientation of the images to be projected, brightness, contrast, aspect ratio, and other projection parameters.

The method 400 further includes configuring 420 the projection system, which includes placing one or more mirrors or other reflective elements in a position that corresponds to the indicated target projection surface and actuating or otherwise disposing projection image shutters into appropriate positions or states dependent at least in part upon the indicated target projection surface and/or the projection data provided in the providing 410 step. More particularly, if shutters are associated with one or more target projection surfaces, the shutters must be open or closed, or placed in corresponding appropriate states, to permit the projected image to pass or not pass, and thereby to project the image onto the target projection surface only while preventing the projection of an image onto any non-indicated projection surface. This may also prevent the light for that image from being seen at any other intermediate location except as a final projected image at the desired projected image location.

The method 400 further includes projecting 430 the image onto the mirror and, thereby, the target projection surface. The projection 430 step projects the images according to the projection parameters. In one embodiment, the projection 430 process determines the characteristics of the target projection surface, such as by one or more sensors, and dependent at least in part thereon adjusts the projection parameters and characteristics of the image to be projected, or otherwise compensates for the characteristics of the target projection surface. For example, the projecting 430 step may determine the distance from the projector to the target projection surface, the color and curvature of the projection surface, and the projection angle, and adjust the projection parameters based on those characteristics.

Projecting 430 the image further includes projecting the image on a target projection surface that may be configured, in one embodiment, as a translucent light-diffusing surface, such as a polymer or plastic surface that is coated with, has embedded therein, or otherwise includes, diffusive particles, and which may be curved or otherwise contoured to match the shape and/or contour of an outer surface of a robot. The target projection surface may be one portion or region of the external surface of the robot, an internal surface of the robot, or may form a portion of both the inner and outer surfaces of the robot. Projecting 430 the image includes projecting an image that appears to be integrated with the skin or outer surface of the robot, rather than being framed within the confines of a conventional display panel. In this embodiment, projecting 430 the image further includes concealing the inner components of the robot from view, whether or not an image is being displayed. Projecting 430 the image may also include projecting the image upon an external projection surface that is not associated with the robot.

While the systems, methods and flow diagram described above have been described with respect to robots, it is to be understood that various other devices that utilize or include display technology can utilize aspects described herein. For instance, various industrial equipment, automobile displays, consumer products, and the like may apply the inventive concepts disclosed herein.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such features may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A mobile device, comprising:
   a processor;
   a memory storing components executable by the processor;
   a projection assembly including a projector, a lens, a movable minor, and a first projection surface integral with a surface of the mobile device, wherein the components include a projection component and a control component, the projection component determining one or more projection parameters and causing the projector to project an image onto the movable minor, dependent at least in part upon the projection parameters, the control component causing the projector and the lens to focus the image onto the first projection surface, the control component further causing the movable mirror to reflect the image as a first projected image onto the first projection surface; and a projection surface shutter associated with the first projection surface, the projection surface shutter being operable to pass the first projected image and block the first projected image from the first projection surface.

2. The mobile device of claim 1, comprising a projection window, the control component being further configured to cause the movable mirror to reflect the image through the projection window as a second projected image onto a second position of a second projection surface, the control component being further configured to cause the movable minor to reflect the image through the projection window as a third projected image onto a third position of the second projection surface.

3. The mobile device of claim 2, further comprising a projection window shutter associated with the projection window, the control component being further configured to cause the projection window shutter to pass the second and third projected images to and block the second and third projected images from the second projection surface.

4. The mobile device of claim 2, wherein the projection component when executed by the processor is further configured to adjust one or more of the projection parameters of the projected image to thereby compensate for a distortion of any of the first, second and third projected images.

5. The mobile device of claim 4, wherein the projection component adjusts the projection parameters dependent at least in part upon one or more of the characteristics of at least one of the first and second projection surfaces.

6. The mobile device of claim 5, wherein the mobile device further comprises one or more sensors configured for sensing the one or more characteristics of the first and second projection surfaces, the projection component adjusting the projection parameters dependent at least in part upon the one or more characteristics of at least one of the first and second projection surfaces sensed by the sensors.

7. The mobile device of claim 5, wherein the one or more characteristics of the first and second projection surfaces sensed by the sensors include one or more of a color, a curvature and a contour of the first and second projection surfaces, and a distance from at least one of the mobile device and the projection assembly to at least one of the first and second projection surfaces.

8. A method of projecting an image via an image projection system, the method comprising:

providing the image to be projected and projection parameters to a projector;

configuring the projection system to project the images upon a target projection surface; and projecting the image onto the target projection surface dependent at least in part upon the projection parameters, wherein the projecting the image step comprises determining the characteristics of the target projection surface and adjusting the projection parameters dependent at least in part upon the determined characteristics of the target projection surface to thereby compensate for an anticipated distortion of the projected image arising at least in part from the determined characteristics of the target projection surface, wherein determining the characteristics of the target projection surface comprises sensing with one or more sensors the characteristics of the target projection surface, wherein the projecting step further comprises projecting the image from an interior of a robot onto a first projection surface, the first projection surface being integral with, and configured to match at least one of a shape, contour, texture and color of, an outer surface of the robot, the first projection surface being further configured to conceal an interior of the robot and the projection assembly regardless of whether the image is being projected onto the first projection surface.

* * * * *